United States Patent Office 3,826,775
Patented July 30, 1974

3,826,775
MODIFIED ALUMINA HYDRATE FLAME RETARDANT FILLER FOR POLYPROPYLENE
Igor Sobolev, Orinda, and Elias A. Woycheshin, Livermore, Calif., assignors to Kaiser Aluminum & Chemical Corporation, Oakland, Calif.
No Drawing. Filed June 21, 1973, Ser. No. 372,343
Int. Cl. C08f 45/04, 45/56
U.S. Cl. 260—42.14      8 Claims

ABSTRACT OF THE DISCLOSURE

Flame retardancy is imparted to polypropylene by the incorporation of 40–70% by weight of modified alumina hydrate, the percentage being based on the filled polypropylene. The alumina hydrate is made compatible with polypropylene by addition of 0.2–5% by weight of an alkylketene dimer of the general formula $$\begin{array}{c} R_1-CH-C=O \\ | \quad\quad | \\ R_2=C-\!\!-\!\!O \end{array}$$

wherein $R_1$ and $R_2$ each have 14–20 carbon atoms.

BACKGROUND OF THE INVENTION

Polypropylene $(C_3H_6)_n$, a synthetic thermoplastic resin, is widely employed in the packaging industry, as molded components for use in automobiles, utensils and appliances, in fiber form for the making of upholstery webbing, carpets cordage, and the like. It is characterized by toughness and flexibility at low temperatures, low vapor transmission and creep characteristics, resistance to attacks by chemical agents and low water absorption capacity. These properties render polypropylene highly desirable for a multitude of applications; however, in many instances where flame retardancy is a requirement, polypropylene does not satisfy required and desired standards. With increasing concern over safety, particularly fire hazards, this lack of flame retardancy considerably limits the use of polypropylene. Attempts have already been made to reduce the flammability of polypropylene by incorporating flame retardant compounds therein. The incorporation of flame retardants in polypropylene is either associated with high costs or in many instances the flame retardants during scorching or at elevated temperatures release toxic and/or corrosive vapors which can detrimentally affect the environment, particularly when in contact with humans. Inorganic fillers, for example alumina hydrate, have been proposed to reduce the flammability of polymers. Inorganic fillers, including alumina hydrate, in the quantities required for imparting flame retardancy can detrimentally influence the physical properties of such polymers; for example, when incorporated into polypropylene, they reduce flexibility and impact strength. Consequently, the use of these inorganic fillers, which are otherwise excellent and cheap flame retardant materials, is considered less desirable for most applications where retention of physical properties is required.

It has now been discovered that when the alumina hydrate is modified with 0.2% to about 5% by weight of an alkylketene dimer, the filled polypropylene will not only exhibit satisfactory flame retardancy, but will also possess improved physical properties when compared to polypropylene filled with an equivalent quantity of unmodified alumina hydrate.

SUMMARY OF THE INVENTION

Flame retardancy is imparted to polypropylene by incorporation therein of 40–70% by weight (based on the filled polymer) alumina hydrate of the formula $$Al_2O_3 \cdot xH_2O,$$

where $x$ is equal to 1.5 to 3, which has been modified by the addition of 0.2–5% by weight of an alkylketene dimer of the general formula $$\begin{array}{c} R_1-CH-C=O \\ | \quad\quad | \\ R_2=C-\!\!-\!\!O \end{array}$$

where $R_1$ and $R_2$ are straight chain or branched saturated or unsaturated hydrocarbons each having 14–20 carbon atoms.

DETAILED DESCRIPTION OF THE INVENTION

This invention provides an improved flame retardant filler for polypropylene. More particularly, it relates to an alkylketene dimer modified alumina hydrate to be used as flame retardant filler for polypropylene.

For the purposes of this invention, the expression "alumina hydrate" refers to an alumina having the general formula $Al_2O_3 \cdot xH_2O$, where $x$ is 1.5 to 3. The alumina hydrate employed for filler can be obtained from any suitable source, one of these being the hydrate precipitated from aqueous sodium aluminate solutions, such as obtained in the Bayer process. To obtain a suitable filler for polypropylene, the alumina hydrate particles should be in the size range of 0.5 to 44 microns; preferably a significant quantity of the hydrate particles should have a size within the range of 2–37 microns, for example at least about 50% by weight.

The alkylketene dimer used for the modification of the alumina hydrate has the general formula of $$\begin{array}{c} R_1-CH-C=O \\ | \quad\quad | \\ R_2=C-\!\!-\!\!O \end{array}$$

wherein $R_1$ and $R_2$ can be straight chain or branched aliphatic saturated or unsaturated hydrocarbons having 14–20 carbon atoms. $R_1$ and $R_2$ can be the same or, if desired, different. Typical alkylketene dimers, which can be successfully employed for the modification of alumina hydrates in accordance with the present invention are dimers prepared from palmitic, stearic, oleic and myristic acids and mixtures thereof.

It has been found that incorporation of alumina hydrate which has been modified with about 0.2% to about 5% by weight alkylketene dimer (calculated on the weight basis of $Al_2O_3$ by heating the hydrate to 1000° C. for 1 hour) in the polypropylene causes a significant improvement in important physical characteristics when compared to polypropylene filled with an equivalent quantity of unmodified hydrate.

Addition or incorporation of the alkylketene dimer in the alumina hydrate can be accomplished in several ways. As the alkylketene dimer employed for the modification of the alumina hydrate is insoluble in water it can be added to the hydrate either in a solution of an organic solvent, such as benzene, kerosene or the like, or if desired in an aqueous dispersion. Intimate admixture of the hydrate with the dimer is recommended to avoid possible localized overconcentrations of the modifier. To assure uniform distribution of the modifier within the hydrate, agitation of alumina hydrate is preferred. Other methods of incorporation include addition of the dimer in solution or in dispersion during, for example, grinding of the hydrate. Also, the hydrate can be slurried either in an aqueous medium or in an organic solvent and addition of the modifier can be conveniently done by incorporating it in the slurry. Naturally, dry hydrate can also be modified by spraying it with a solution or dispersion of the modifier, while the hydrate is being agitated. It has been found that flame retardant properties can be imparted to polypropylene by incorporating therein from about 40% to 70% by weight (based on the filled polypropylene) modified alumina hydrate. The preferred range wherein the physical properties of the filled polypropylene are satisfactorily improved was found to be within about 40% and 60%. Modified alumina hydrate quantities in excess of about 70% can also be added to the polypropylene and while further improvement in flame retardancy can be observed due to the increased quantity of hydrate, significant deterioration of physical properties, such as reduction in impact strength and tensile strength makes addition of more than about 70% by weight modified hydrate undesirable. Hydrate quantities below about 40% do not satisfy the flame retardancy requirements desired from filled polypropylene.

There are several methods for the incorporation of the modified alumina hydrate in polypropylene. For example, if the polypropylene is in sheet form, the modified alumina hydrate can be added as a free-flowing powder in a two-roll mill at elevated temperatures capable of softening the polypropylene. Uniform addition of the hydrate to the roll will assure uniform distribution of the hydrate within the sheet advanced through the rolls at a substantially constant rate of speed. Also, the modified hydrate can be added to beads of polypropylene or powdered polypropylene and after admixture to provide uniform distribution, the filled polypropylene can be processed, for example by casting or extrusion to the desired shape. Processing of the polypropylene filled with the modified hydrate can proceed in any well-known manner usually employed in the plastic industry.

The modified alumina hydrate filled polypropylene exhibits in addition to flame retardancy, low smoke density, and its improved physical properties allow its use in many applications which were heretofore avoided, due to the decreased strength imparted by unmodified alumina hydrate.

The following Example and Table will further illustrate the novel aspects of the invention.

EXAMPLE (1) Modification of Alumina Hydrate (a) 20 grams of alkylketene dimer, derived from a mixture of $C_{14}$–$C_{20}$ fatty acids and having a molecular weight of about 530, a melting point of 41.3° C. and a density of about 0.4 g./cm.$^3$, were dissolved in 380 ml. benzene in a 1.5 liter resin kettle equipped with a heating mantle and an agitator. 400 grams alumina hydrate, characterized by a loss on ignition (at 1000° C. for 0.5 hours) of 34.6%, a particle size wherein 96% of the particles passed through a sieve having openings of 0.044 mm., and a purity of at least 99%, were added to the dimer solution during agitation. The temperature of the mixture was then raised to 80° C. and kept at this temperature for 1 hour. Subsequently, the mixture was filtered and the solids obtained were dried overnight at 60° C. The filtrate was evaporated and the solid residue weighed to determine by differential analysis the quantity of dimer incorporated in the hydrate. By this analysis it was found that the hydrate contained 0.44% by weight of alkylketene dimer.

(b) The modification of alumina hydrate was repeated using an aqueous emulsion of the same alkylketene dimer. The concentration of the dimer in the emulsion was about 6% by weight. This emulsion was uniformly admixed with alumina hydrate of the type described in (a) and the mixture was dried overnight at about 105–110° C. to remove water. The weight increase of the alumina hydrate indicated that about 2% by weight alkylketene dimer was incorporated in the hydrate.

(c) Modification of alumina hydrate was repeated by grinding alumina hydrate and incorporating therein during grinding to assure uniform distribution about 3% by weight solid, ground alkylketene dimer of the type described under (a).

(2) Addition of the Modified Alumina Hydrate to Polypropylene

The alkylketene dimer treated alumina hydrate designated as (a) above was incorporated into polypropylene (ASTM D–2146–68) having physical characteristics shown in the Table. Incorporation was accomplished by using a two-roll (6" x 13") differential speed laboratory mill having a roll speed ratio of 1.29:1. The front roll temperature was kept at 193° C. The polypropylene, in the form of pellets, was first softened and then the alumina hydrate was added. The mixture was removed from the roll with a blade and returned several times to obtain uniform distribution of the hydrate within the polypropylene. Total time on the mill was about 10 minutes for each run. Test plaques (6" x 6" x 1/8") were then compression molded from the milled sheets on a 30 ton press having heated platens (185° C.) and test specimens were cut from the plaques.

Polypropylene samples, containing modified alumina hydrate at a 40, 50 and 60% by weight (based on the filled polypropylene) level, were tested together with polypropylene containing 40% by weight calcium carbonate of the type shown in the Table. For comparison unfilled polypropylene was also tested. The test results are shown in the Table.

TABLE

| Physical properties | Test samples | | | | | |
|---|---|---|---|---|---|---|
| | A[1] | B[2] | C[3] | D[4] | E[5] | F[6] |
| Tensile strength p.s.i. (ASTM D638) | 5,280 | 3,280 | 2,630 | 2,290 | 3,320 | 3,210 |
| Elongation percent at break (ASTM D638) | 270 | 40 | 16 | 6 | 19 | 14 |
| UL94 (horiz.) burn rate inch/minute | 0.90 | 0.42 | 0.35 | ([7]) | 0.51 | 0.93 |
| Maximum smoke density percent (ASTM D2843) | 24 | 6 | 5 | 0 | 8 | 26 |
| Smoke density rating percent (ASTM D2843) | 15 | 4 | 3 | 0 | 5 | 5 |
| Impact strength (IZOD) ft.-lb./in. (ASTM D256) | 0.44 | 0.39 | 0.32 | 0.26 | 0.40 | 0.39 |

[1] Sample "A"=Unfilled polypropylene, density 0.905 g./cm.$^3$, melting point 171.1° C. (ASTM D–2117–64).
[2] Sample "B"=Polypropylene filled with 40% by weight modified alumina hydrate, modified with 0.44% by weight of alkylketene dimer in accordance with the procedure shown under 1(a) of the example.
[3] Sample "C"=Polypropylene filled with 50% by weight modified alumina hydrate, modified as above in ([2]).
[4] Sample "D"=polypropylene filled with 60% by weight modified alumina hydrate, modified as above in ([2]).
[5] Sample "E"=polypropylene and 40% by weight of unmodified alumina hydrate.
[6] Sample "F"=polypropylene and 40% by weight of calcium carbonate; mean particle size 2.5 microns, specific gravity 2.71 purity 98.2%, index of refraction 1.59.
[7] Self-extinguishing.

These results clearly indicate the significant improvements in physical properties imparted by the modification of alumina hydrates wtih alkylketene dimers. Particularly advantageous results can be obtained with regard to elongation, burn rate, smoke density and retention of impact strength can also be achieved.

What is claimed is:

1. A process for imparting flame-retardancy to polypropylene by incorporation of alumina hydrate as flame-retardant filler and simultaneously causing an increase in the physical strength of the hydrate filled polypropylene which comprises:

(a) modifying the alumina hydrate filler having the general formula of $Al_2O_3 \cdot xH_2O$, wherein $x$ equals 1.5 to 3, by adding an amount of alkylketene dimer equivalent to about 0.2 to 5% by weight based on the $Al_2O_3$ content of the hydrate, the alkylketene dimer having the formula of

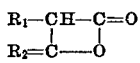

wherein $R_1$ and $R_2$ are selected from the group of straight and branched chain, saturated and unsaturated hydrocarbons and their mixtures, $R_1$ and $R_2$ each having 14 to 20 carbon atoms; and (b) incorporating the modified alumina hydrate filler in the polypropylene in an amount equivalent to about 40 to about 70% by weight of filled polypropylene.

2. Process according to claim 1, wherein the modified alumina hydrate is incorporated in the polypropylene in an amount equivalent to about 40 to about 60% by weight of filled polypropylene.

3. Process according to claim 1, wherein the alumina hydrate filler has a particle size within the range of 0.5 to 44 microns.

4. An alumina hydrate filled polypropylene composition exhibiting flame retardant properties and improved physical strength which comprises polypropylene containing from about 40% by weight to about 70% by weight modified alumina hydrate based on the filled polypropylene, wherein the alumina hydrate, having the general formula of $Al_2O_3 \cdot xH_2O$, where $x$ is equal to 1.5 to 3, is modified with 0.2 to 5% by weight alkylketene dimer, the dimer weight being based on the $Al_2O_3$ content of the hydrate, the dimer having the general formula

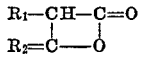

wherein $R_1$ and $R_2$ are selected from the group consisting of straight and branched chain saturated and unsaturated hydrocarbons, $R_1$ and $R_2$ each having 14 to 20 carbon atoms.

5. Composition of claim 4, wherein the polypropylene contains modified alumina hydrate in an amount equivalent to about 40 to about 60% by weight of filled polypropylene.

6. Composition of claim 4, wherein the alumina hydrate has a particle size from 0.5 to 44 microns.

7. Process according to claim 1 wherein said alkylketene dimer is prepared from an acid selected from the group consisting of palmitic, stearyl, oleyl, myristyl and mixtures thereof.

8. Composition of claim 5 wherein said alkylketene dimer is prepared from an acid selected from the group consisting of palmitic, stearyl, oleyl, myristyl and mixtures thereof.

References Cited

UNITED STATES PATENTS

| | | | |
|---|---|---|---|
| 3,290,165 | 12/1966 | Iannicelli et al. | 106—308 |
| 3,563,939 | 2/1971 | Stevens et al. | 260—37 |

ALLAN LIEBERMAN, Primary Examiner

J. H. DERRINGTON, Assistant Examiner

U.S. Cl. X.R.

106—288 B, 308 Q, 308 F; 260—42.45, 45.7 R